United States Patent [19]

Condy

[11] Patent Number: 4,531,690

[45] Date of Patent: Jul. 30, 1985

[54] VARIABLE CAPACITY REUSABLE DUAL TAPE DISPENSING CARTRIDGE

[76] Inventor: Robert J. Condy, 128 Luray Dr., Los Gatos, Calif. 95030

[21] Appl. No.: 588,360

[22] Filed: Mar. 12, 1984

[51] Int. Cl.[3] .......................... B41J 35/28; G03B 1/04

[52] U.S. Cl. ...................................... 242/197; 400/208

[58] Field of Search .............. 242/197, 199, 200, 55.3; 400/613, 615.2, 694, 207, 208, 208.1; 360/132; 234/128–130

[56] References Cited

U.S. PATENT DOCUMENTS

| | | | |
|---|---|---|---|
| 2,107,603 | 2/1938 | Ellenburg | 242/55.3 |
| 3,834,507 | 9/1974 | Bradshaw | 400/615.2 |
| 3,912,064 | 10/1975 | Bluem et al. | 400/134.6 |
| 4,226,547 | 10/1980 | Bradshaw et al. | 400/613 |
| 4,391,539 | 7/1983 | Connoy | 400/208 |

*Primary Examiner*—Leonard D. Christian
*Attorney, Agent, or Firm*—Thomas E. Schatzel

[57] ABSTRACT

A variable capacity reusable dual tape dispensing cartridge for use with tape printing machines having guide rings to support the tape within the cartridge, select apertures in the cartridge to allow the cartridge to store large quantities of tape, use of a roller bearing to prevent tape backflow into the cartridge and reusable fastener means to allow the cartridge to be opened and resealed so as to replace tape or repair the internal components of the cartridge.

11 Claims, 8 Drawing Figures

VARIABLE CAPACITY REUSABLE DUAL TAPE DISPENSING CARTRIDGE

BACKGROUND OF THE INVENTION

1. Field of the Invention

The present invention relates to tape cartridges for use with tape printing machines and more particularly to variable capacity reusable dual tape distribution cartridges.

2. Description of the Prior Art

The use of tape printing machines to produce adhesive lettering tape for labeling purposes such as those disclosed in U.S. Pat. Nos. 3,912,064 and 3,834,507 is increasing. Tape cartridges are a means by which to load tape into and dispense tape from the tape printing machines.

Dual tape dispensing cartridges are known in the prior art. Such cartridges are described in U.S. Pat. Nos. 2,107,603 and 4,226,547. A dual tape dispensing cartridge is also marketed by the Repeat-o-Type Manufacturing Corporation of Wayne, N.J. under the trademark "TYPE-Tape". The cartridges described in the patents and the Repeat-o-Type cartridge are capable of simultaneously dispensing two different types of tape. U.S. Pat. No. 4,226,547 and the Repeat-o-Type cartridge are specifically designed to work in conjunction with the aforementioned printing machines.

The use of single tape dispensing cartridges would have disadvantages when used with todays printing machines. One disadvantage would concern the amount of space required to house two cartridges within the machine. The increased amount of space would result in higher manufacturing and material costs for the printing machines. Furthermore, the increased cost of two cartridges would decrease the economic feasibility of use of such with present day tape printing machines. These problems have been partially avoided by systems wherein the two tapes utilized by the printing machines are simultaneously dispensed by a single tape cartridge.

In utilizing a dual dispensing tape cartridge it is necessary that the cartridge be simple to load and unload from the machine while maintaining the lowest parts, manufacturing and packaging costs possible.

One disadvantage of the conventional dual tape cartridge is that they are expensive to manufacture and package.

Another disadvantage of conventional dual tape distribution cartridges especially, when used with the aforementioned type printing machines, concerns the limited amount of tape able to be stored in each cartridge requiring time to be wasted in loading and unloading the tape cartridges when the tape has played out.

A further disadvantage of the conventional dual distribution tape cartridge design concerns the method by which tape is prevented from moving backward into the cartridge. Neither the Repeat-o-Type cartridge or the cartridge disclosed in U.S. Pat. No. 2,107,603 prevent tape back slippage while the cartridge disclosed in U.S. Pat. No. 4,226,547 utilizes a sharp edged spring clip as a tape back stop, which under some circumstances may damage the tape.

SUMMARY OF THE PRESENT INVENTION

It is therefore an object of the present invention to provide a variable capacity tape dispensing cartridge capable of storing larger amounts of tape than conventional dual tape dispensing cartridges.

It is a further object of the present invention to provide an economical variable tape capacity dual tape dispensing cartridge that maintains low manufacturing and packaging costs.

It is another object of the present invention to provide a variable tape capacity dual tape cartridge that prevents backward movement of the tape into the cartridge without damaging the tape.

Briefly, a preferred embodiment of the present invention includes a hollow tape cartridge housing having two-halves and a plurality of guide members and guide rings. The guide rings provide the mounting platforms for rolls of dispensible tape within the cassette and the tape is mounted in a freely rotatable manner. The guide posts provide attachment points for other components and are utilized to fasten the two halves of the cartridge together. Also included in the cassette housing and mounted on a guide post in a rotatable manner is a one-way bearing over which adhesive backing tape is designed to pass. Compressing the adhesive backing tape against the one-way bearing is an L-shaped pawl rotatably mounted on another guidepost in conjunction with a cylindrical helical spring tensioner. The pawl compresses the tape against the one-way bearing to prevent backward movement of the tape into the housing without damaging the tape.

The adhesive backing tape is mounted within the housing as to allow greater than conventional amounts of tape to be stored within the housing. To accomplish such the housing has three elongated rectangular slots located on the lateral sides of the cassette housing. Inclusion of these three elongated rectangular slots in the housing allows the adhesive backing tape roll to extend slightly outward from the cartridge. This design allows extra tape to be stored within cartridges of conventional dimensions. In most applications the size and the dimensions of the cassette housing are determined by the printing machine to be used. Use of the present invention with printing machines of the type disclosed in U.S. Pat. No. 3,834,507 requires catridges of predetermined sizes and shapes. The aforementioned tape printing machines will accommodate the present invention when a blunt blade-type device is used during insertion of the cartridge into the machine to shield and compress a portion of the adhesive backing tape protruding from the cartridge. Once inside the machine the blade device is easily removed and the adhesive backing tape roll is allowed to expand allowing greater quantities of tape than normally available to be stored inside the tape housing.

Located slightly above the adhesive backing tape roll is a roll of transferable image ribbon mounted on the guide rings and a set of wave washers. Both the adhesive backing tape and the transferable image ribbon exit the tape housing through an exit slot located in close proximity to the one-way bearing.

In applications utilizing the aforementioned printing machine the present invention includes a small rectangular plastic guide platform which once inserted in the machine does not have to be constantly removed and replaced when the tape cartridge is renewed. The tape cartridge halves are held together by screw fasteners.

One advantage of the present invention is that it is economical to manufacture and package.

Another advantage of the present invention is that it is designed to hold larger quantities of tape than conventional dual tape dispensing cartridges.

Another advantage of the present invention is that it prevents backward movement of the tape into the cartridge without damaging the tape.

These and other objects and advantages of the present invention will no doubt become apparent to those skilled in the art after having read the following detailed description of the preferred embodiment which is illustrated in the various figures of the drawing.

IN THE DRAWING

DETAILED DESCRIPTION OF THE PREFERRED EMBODIMENT

Figure 1:
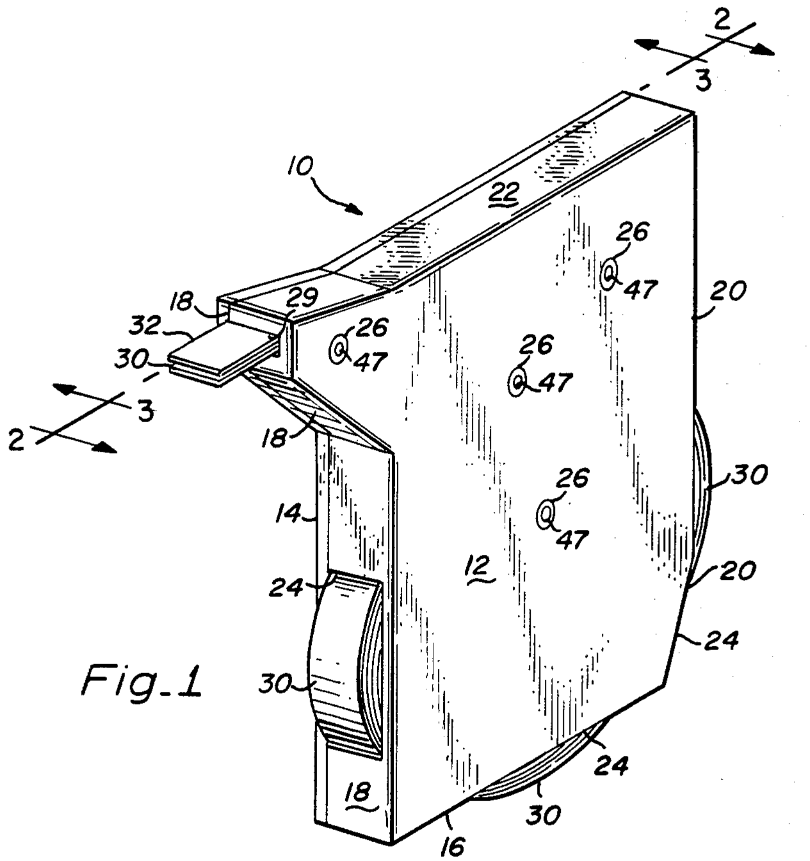
FIG. 1 is a perspective view of a reusable dual tape dispensing cartridge according to the present invention.
Figure 2:
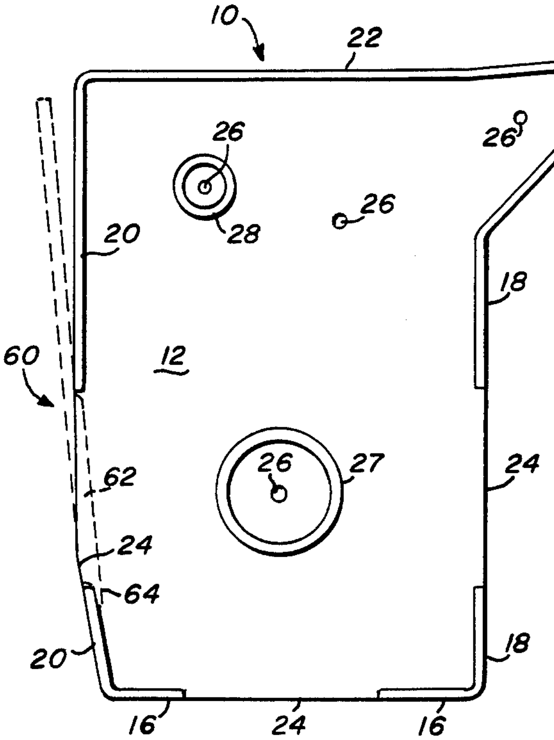
FIG. 2 is a sectional view of the cartridge according to FIG. 1 taken along line 2—2 and rotated to illustrate the interior of the front plate.

FIGS. 1–4 illustrate a dual tape dispensing cartridge, according to the present invention and referred to by general reference character 10. The cartridge 10 is adapted for use with certain types of tape printing machines, e.g. those disclosed in U.S. Pat. No. 3,912,064. Cartridge 10 has a hollow two-part separable housing including a front plate 12 and a rear plate 14.

Front plate 12 includes a pair of planar bottom side protrusions 16, a right side planar protrusion 18, a pair of left side planar protrusions 20, and a top side planar protrusion 22. A set of three tape expansion slots 24 are included with one slot 24 between the protrusions 20, another slot 24 between the protrusions 18, and another slot 24 between the protrusions 16. A plurality of fastener apertures 26 are included to receive fasteners. Two guide rings 27 and 28 are positioned about the apertures 26. A tape exit slit 29 is positioned between the protrusions 18 and 22. Front plate 12 is generally of a flat rectangular shape with a semi-triangular portion at one corner.

The exact dimensions and shape of cartridge 10, front plate 12, and rear plate 14 are determined by the design of the tape printing machine (not shown) with which cartridge 10 is utilized. Front plate 12 and rear plate 14 may be comprised of a rigid injection moldable material, such as a thermal plastic. Other materials of a non-injectible moldable type may also be utilized to fabricate plates 12 and 14, such as metal or wood, but, the use of injection moldable thermal plastics has been determined to yield a favorable cost effective means by which to fabricate cartridge 10.

Figure 3:
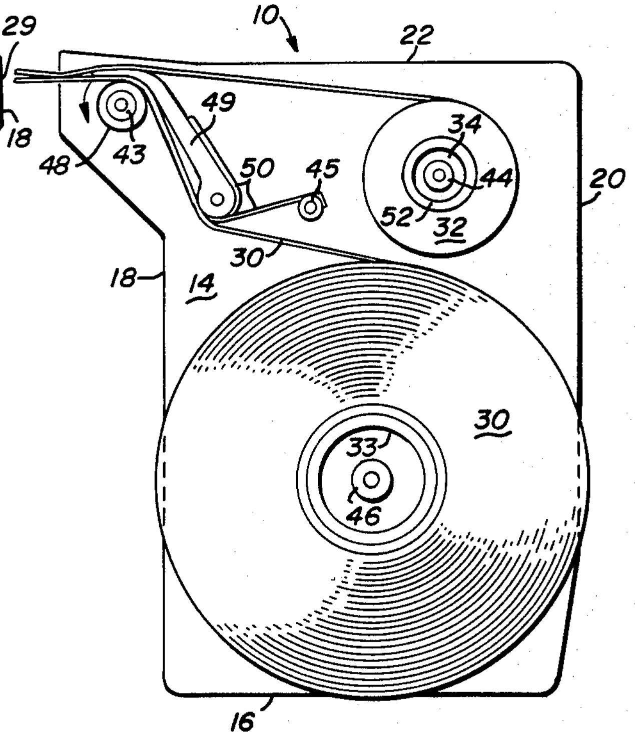
FIG. 3 is a sectional view of the cartridge according to FIG. 1 taken along line 3—3.
Figure 4:
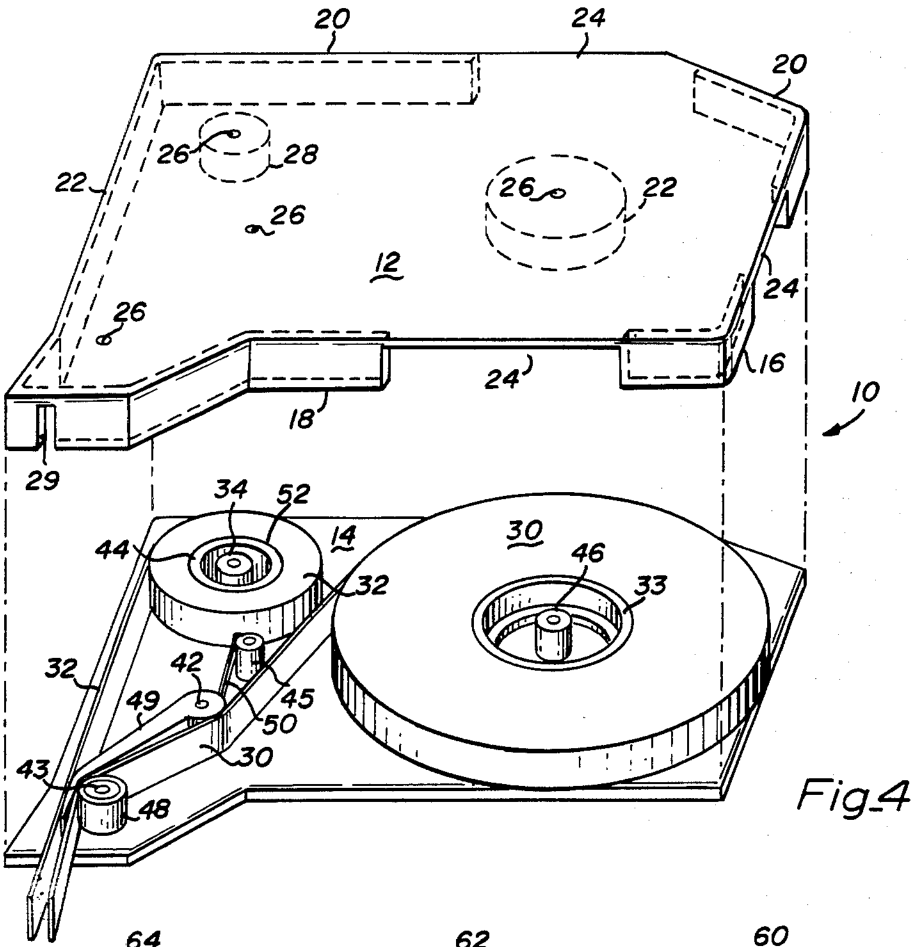
FIG. 4 is an exploded view of the cartridge of FIG. 1.

Side protrusions 16, 18, 20 and 22 are fixedly mounted on front plate 12 in a joint free manner. The slots 24 are of such dimensions as to allow a predetermined amount of adhesive backing tape on a roll 30 to protrude from cartridge 10 when the roll 30 is mounted as illustrated in FIG. 3. Guide rings 27 and 28 are of a rigid cylindrical design capable of supporting a predetermined sized roll 30 of adhesive backing tape about the ring 27 and a predetermined size roll of image transferring ribbon 32 about the ring 28. The rolls of tape 30 and ribbon 32 are mounted on guide rings 28 so as to freely rotate response to tension on the tape and ribbon.

Rear plate 14 also incorporates a pair of guide rings 33 and 34 to coact with the rolls of tape 30 and ribbon 32, respectively. The guide rings 27 and 28 of the front plate 12 should be directly opposite the guide rings 33 and 34 of plate 14 when cartridge 10 is assembled so that the rolls may rotate with minimal malfunction.

Fastener apertures 26 are located at predetermined positions on front plate 12 as shown with two being coaxial with the rolls 30 and 32.

Rear plate 14 includes a plurality of guide posts 42, 43, 44, 45 and 46 which are of a cylindrical design fixably mounted to rear plate 14. Guide posts 42–46 extend from rear plate 14 toward front plate 12 when cartridge 10 is assembled. Guide posts 42–46 are positioned such that when cartridge 12 is assembled, they are coaxial with one of the fastener apertures 26. Guide posts 42–46 are each designed to support components, to be described hereinafter, and to provide a secure fastening platform for fasteners 47. Fasteners 47 can be of any detachable reusable type such as a helical screw. When cartridge 10 is assembled, fasteners 47 pass through fastener apertures 26 and engage the portions of the particular associated guide post 42–46 so as to securely fasten front plate 12 to rear plate 14 in a detachable manner.

Mounted on guide post 43 is, a one-way roller bearing 48, and on guide post 42 an "L" shaped pawl 49, and a spring tensioner 50. Bearing 48 is designed to rotate freely in a counter-clockwise manner as shown in FIG. 3, but, prohibits clockwise motion. Tensioner 50 is designed to exert a downward force on pawl 49 causing pawl 49 to apply downward pressure on bearing 48.

When cartridge 10 is assembled rolls of tape 30 and ribbon 32 are mounted on guide rings 33 and 34, respectively. The roll of ribbon 32 is supported by guide rings 33 and by two wave washers 52. Wave washers 52 are positioned on each side of the roll of ribbon 32 to cause a drag on the rotation of the roll of ribbon 32 thereby preventing ribbon 32 from unintentionally unraveling within and from passing back into cartridge 10. Tape 30 as shown, in FIG. 3 passes between bearing 48 and pawl 49 before its exits through slit 29. Thus, tape 30 is thereby prevented from slipping backwards into cartridge 10 without any damage resulting to tape 30. Ribbon 32 passes over the top surface of pawl 49 as it exits slit 29 as shown.

Figure 5:
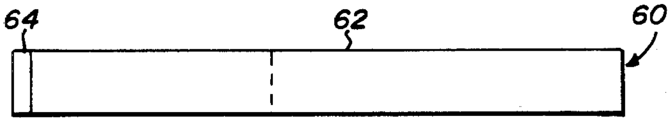
FIG. 5 is a top view of a cartridge blade inserter, for use with the cartridge of FIG. 1.
Figure 6:
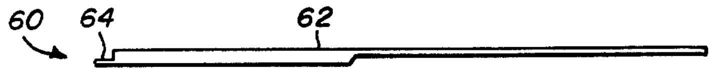
FIG. 6 is a side view of the cartridge blade inserter of FIG. 5.

FIGS. 5 and 6 illustrate a semi-rigid blade insertion device referred to by general reference character 60. Blade 60 includes a generally flat rectangular handle 62 and an indented notch tab end 64 as shown. The blade 60 may be an injection molded plastic part. The extension slots 24 allow for a greater than conventional amount of tape 30 to be mounted in cartridge 10. The periphery of tape 30 may extend beyond the periphery of cartridge 10 as shown in FIGS. 1 and 3, and this does not effect the operation of cartridge 10 or the operation of the printing machine in which cartridge 10 is installed. However, tape 30 extending outwardly from cartridge 10 may prohibit simple insertion of cartridge 10 into certain printing machines. To eliminate this problem blade 60 is utilized to compress tape 30 into cartridge 10 during insertion of cartridge 10 into a printing machine. Specifically, the notched tab end 64 of blade 60 is placed partially within slot 24 intermediate protrusions 20 as illustrated in ghost in FIG. 2. Blade 60 is orientated with its tab end 64 facing toward bottom side protrusion 16, and its handle 62 facing top sides 22. In its proper position blade 60 covers slot 24 while compressing tape 30 into cartridge 10. Thus, blade 60 facilitates insertion of cartridge 10 into the printing machine and allows greater than conventional amounts of tape 30 to be stored within cartridge 10.

Figure 7:
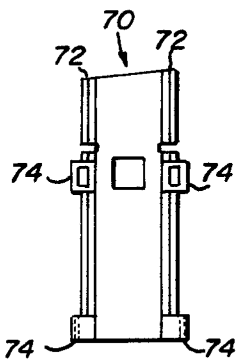
FIG. 7 is a top view of a discreet tape/ribbon guide platform, for use with the cartridge of FIG. 1.
Figure 8:
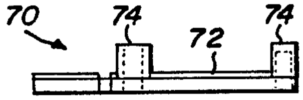
FIG. 8 is a side view of the tape/ribbon guide platform of FIG. 7.

FIGS. 7 and 8 illustrate a rigid tape/ribbon guide platform referred to by general reference character 70. Platform 70 is specifically designed to support tape 30 and ribbon 32 in a printing machine such as that described in U.S. Pat. Nos. 3,834,507 and/or 3,912,604. Platform 70, which may be an injection molded plastic, is located adjacent to cartridge 10 in the printing machine and includes a series of guide ridges 72 and hollow carrier columns 74. The guide ridges 72 ensure that tape 30 and ribbon 32 from cartridge 10 follow a predetermined path through the printing machine while carrier columns 74 provide a means to mount platform 70 within the printing machine. Platform 70 is necessary in certain applications to ensure that tape 30 and ribbon 32 travel through the printing machine and in a uniformly flat manner. Platform 70 is inexpensive to manufacture and does not require separate guides for tape 30 and ribbon 32 as in conventional cartridges, such as the Repeat-O-Type cartridge and the cartridge disclosed in U.S. Pat. No. 4,226,547. Once placed within the printing machine platform 70 does not need to be constantly removed and replaced when cartridge 10 is renewed.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A dual tape dispensing cartridge for use with a tape printing machine comprising:

a housing having a first half and a second half member, said first half member being predominantly flat and semi-rectangular with at least four flat lateral edge protrusions, a plurality of raised guide posts, a plurality of guide rings for receiving removable fasteners, said edge protrusions defining elongated slot apertures and a narrow slit aperture, said slit aperture being located on the same side as at least one slot aperture with the other slot apertures being located on independent sides from said slit aperture and from each other, said second half member being semi-rectangular with dimensions compatible with said first half member and defining at least one circular aperture positioned to correspond with at least one guide post when said half members are placed together, said second half member including at least two raised guide rings positioned about said select circular apertures in a parallel relationship with said guide rings when said first and second half members are fitted together and said guide rings defining a two-sided mounting platform upon which cylindrical structures may rotate;

a roll of adhesive backing tape rotatably mounted between two predetermined guide rings within said hollow housing;

a roll of image transferring ribbon rotatably mounted between two predetermined guide rings within said hollow cylindrical housing;

a pair of washers mounted on opposite sides of said roll of ribbon between said guide rings and said roll of ribbon so as to place said roll of ribbon under compression and create a retardent force whereby said roll of ribbon is prevented from unravelling in said housing;

a one-way roller bearing mounted about a predetermined guide post near said slit and positioned adjacent the tape path to accomodate the passage of said backing tape over the outermost surface of said bearing toward said slit, said bearing having an abrasive outer surface to resist tape movement over said outer surface when said bearing is stationary and prevents movement of said tape in the direction away from said slit;

a pawl pivotably mounted within said hollow housing about a predetermined guide post and positioned to exert pressure on said tape passing over said one-way bearing;

a spring within said hollow housing in contact with and placing tension on said pawl toward said bearing; and fastening means in said apertures securely fastening said first and second half members together.

2. A cartridge of claim 1 further including a blunt tapered elongated rectangular blade with one flat end and one notched tab end, said blade being insertable into one slot in said housing so as to compress said adhesive backing tape toward said housing, said blade being removable from said housing subsequent to the placement of a housing within said printing machine.

3. A cartridge of claim 1 further including a removable rectangular ribbon/tape platform for use within a printing machine having guide ridges to uniformly guide said tape and said ribbon through said machine and having attachment means to mount said platform in said machine such that once said platform is inserted in said machine it need not be removed each time said cartridge is removed from said machine.

4. A cartridge of claim 1 wherein two of said slot apertures are positioned parallel to each other and perpendicular to said third slot aperture to allow excess adhesive backing tape to emerge from said housing whereby said housing is capable of enclosing more adhesive backing tape than if said housing did not have said slot apertures.

5. A cartridge of claim 4 wherein said adhesive tape and said image transferring ribbon exit said housing through said slit aperture.

6. A cartridge of claim 5 wherein said imaging ribbon passes about the upper surface of said pawl as it exists said housing.

7. A cartridge of claim 6 wherein said fasteners are tapered helical type screws.

8. A cartridge of claim 7 wherein at least a portion of one of said guide posts have a threaded aperture into which said tapered helical screws are fitted.

9. A cartridge of claim 8 wherein said housing is comprised of a molded thermal plastic.

10. A cartridge of claim 9 wherein said tapered helical screws are passed through said circular apertures in said second half member and are screwed into said threaded guide post apertures in said first half member to securely fasten the first and second half members together such that said screws can be removed to allow said housing to be opened and said tape and/or said ribbon replaced.

11. A cartridge of claim 10 wherein said housing is of dimensions to be adaptable for use in a tape well of a tape printing machine.

* * * * *